(12) United States Patent
Panemangalore et al.

(10) Patent No.: US 10,748,116 B2
(45) Date of Patent: *Aug. 18, 2020

(54) TEST VECTOR GENERATION FROM DOCUMENTATION

(71) Applicant: DELL PRODUCTS L.P., Round Rock, TX (US)

(72) Inventors: Sachinrao Chittaranjan Panemangalore, San Jose, CA (US); Vinay Sawal, Fremont, CA (US); Vivek Dharmadhikari, San Jose, CA (US); Kuntal Atulbhai Patel, San Jose, CA (US); Gavin Richard Cato, Los Gatos, CA (US); Joseph LaSalle White, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,116

(22) Filed: Feb. 16, 2016

(65) Prior Publication Data

US 2017/0109698 A1 Apr. 20, 2017

Related U.S. Application Data

(63) Continuation-in-part of application No. 14/885,015, filed on Oct. 16, 2015.

(51) Int. Cl.
*G06Q 10/10* (2012.01)
*G06F 16/332* (2019.01)
*G06F 16/35* (2019.01)

(52) U.S. Cl.
CPC ......... *G06Q 10/10* (2013.01); *G06F 16/3329* (2019.01); *G06F 16/35* (2019.01)

(58) Field of Classification Search
CPC ......... G06F 17/30654; G06F 17/30321; G06F 17/30253; G06F 11/3668; G06Q 10/10
(Continued)

(56) References Cited

U.S. PATENT DOCUMENTS 6,065,003 A 5/2000 Sedluk
6,070,133 A 5/2000 Brewster
(Continued)

OTHER PUBLICATIONS

Fontoura et al;Inverted Index Support for Numeric Search;Sep. 12, 2005; 22 pages (Year: 2005).*

(Continued)

*Primary Examiner* — Wei Y Zhen
*Assistant Examiner* — Brahim Bourzik
(74) *Attorney, Agent, or Firm* — North Weber & Baugh LLP

(57) ABSTRACT

Aspects of the present disclosure relate to systems and methods that help automate the generation of a test vector. Every functional product, be it a service, device, or combination thereof, has one or more documents associated with it. These documents may include such documentation as: (1) Release Notes; (2) Configuration Guides; (3) command line interfaces (CLIs)/application program interfaces (APIs); (4) Data Sheets; (5) Installation Guides; (6) User Manuals; (7) Errata notices; and (8) other documentation. In embodiments, command data-models and ranges and sequence of valid inputs to the data-model are extracted from natural language expressions in documentation related to a specific product. In embodiments, this extracted information is used to generate one or more table of attributes and properties or constraints about which a test vector may be generated for testing a command.

20 Claims, 14 Drawing Sheets

(58) Field of Classification Search
USPC ............................................................ 717/125
See application file for complete search history.

(56) References Cited

U.S. PATENT DOCUMENTS

| | | | |
|---|---|---|---|
| 6,275,976 B1* | 8/2001 | Scandura | G06F 11/3696 714/E11.208 |
| 9,043,759 B1* | 5/2015 | Lininger | G06F 11/3684 717/106 |
| 9,722,879 B1 | 8/2017 | Muthu | |
| 9,792,275 B2 | 10/2017 | Panemangalore | |
| 9,805,717 B2 | 10/2017 | Panemangalore | |
| 2004/0117380 A1 | 6/2004 | Perrow | |
| 2004/0205560 A1* | 10/2004 | Polk | G06F 17/272 715/234 |
| 2006/0195747 A1* | 8/2006 | Pramanick | G01R 31/31907 714/742 |
| 2007/0061348 A1* | 3/2007 | Holland | G06F 17/27 |
| 2008/0127043 A1* | 5/2008 | Zhou | G06F 11/3604 717/104 |
| 2008/0140537 A1 | 6/2008 | Powell | |
| 2009/0094231 A1* | 4/2009 | Marvit | G06F 17/218 |
| 2009/0288072 A1* | 11/2009 | Kania | G06F 11/368 717/131 |
| 2009/0319388 A1 | 12/2009 | Yuan et al. | |
| 2010/0010989 A1 | 1/2010 | Li | |
| 2010/0082333 A1 | 4/2010 | Al-Shammari | |
| 2011/0022560 A1* | 1/2011 | Breiter | G06N 5/04 706/47 |
| 2011/0145316 A1* | 6/2011 | Ait-Ameur | H04L 29/12066 709/203 |
| 2011/0179037 A1* | 7/2011 | Mizuguchi | G06F 16/353 707/740 |
| 2012/0016909 A1 | 1/2012 | Narain | |
| 2012/0089394 A1 | 4/2012 | Teodosiu | |
| 2013/0055029 A1* | 2/2013 | Lawrance | G06F 11/3684 714/38.1 |
| 2013/0238629 A1 | 9/2013 | Kosuri | |
| 2013/0268260 A1 | 10/2013 | Lundberg | |
| 2013/0268916 A1* | 10/2013 | Misra | G06F 8/74 717/123 |
| 2013/0268917 A1* | 10/2013 | Chandrasekharan | G06F 8/30 717/126 |
| 2014/0106734 A1 | 4/2014 | Lee | |
| 2014/0136187 A1 | 5/2014 | Wolverton | |
| 2014/0214904 A1 | 7/2014 | Ims | |
| 2014/0223417 A1* | 8/2014 | Schnitzhofer | G06F 8/10 717/123 |
| 2014/0282178 A1 | 9/2014 | Borzello | |
| 2015/0019991 A1 | 1/2015 | Krist j nsson | |
| 2015/0052147 A1 | 2/2015 | Halabi | |
| 2015/0254337 A1 | 9/2015 | Iikura | |
| 2015/0348554 A1 | 12/2015 | Orr | |
| 2016/0026631 A1 | 1/2016 | Salam | |
| 2016/0042299 A1 | 2/2016 | Liang et al. | |
| 2016/0140123 A1 | 5/2016 | Chang | |
| 2016/0225371 A1 | 8/2016 | Agrawal | |
| 2017/0109356 A1 | 4/2017 | Sawal | |
| 2017/0109697 A1 | 4/2017 | Panemangalore | |
| 2017/0109698 A1 | 4/2017 | Sachinrao | |
| 2017/0322861 A1* | 11/2017 | Chan | G06F 9/30058 |
| 2018/0052663 A1* | 2/2018 | Castelli | G06F 11/36 |
| 2018/0267887 A1 | 9/2018 | Dsouza | |

OTHER PUBLICATIONS

"Gensim: Topic modelling for humans", [online], [retrieved Jul. 27, 2016]. Retrieved from Internet < URL: https://radimrehurek.com/gensim/index.html> (2pgs).

Google Code Archive—long term storage for Google Code Project Hosting, word2vec, "Tools for computing continuous distributed representations of words", [online] [retrieved Jul. 27, 2016]. Retrieved from Internet <URL: https://code.google.com/p/word2vec> (7pgs).

Sentiment Analysis—text-processing.com API 1.0 documentation, [online], [retrieved Jul. 27, 2016] Retrieved from Internet < URL: http://text-processing.com/docs/sentiment.html> (2pgs).

The Stanford Natural Language Processing Group, "Software (/software/) >Stanford Relation Extractor", [online], [retrieved Jul. 27, 2016]. Retrieved from Internet < URL: http://nlp.stanford.edu/software/relationExtractor.html> (3pgs).

Sentiment Analysis with Python NLTK Text Classification, [online], [retrieved Jul. 27, 2016]. Retrieved from Internet <URL:http://text-processing.com/demo/sentiment/> (3pgs).

U.S. Appl. No. 14/885,015, Oct. 16, 2015, Panemangalore, Document Verification.

U.S. Appl. No. 15/098,107, Apr. 13, 2016, Sawal, Design Validation Using Natural Language Processing.

U.S. Appl. No. 15/268,488, Sep. 16, 2016, Sawal, User-Specific Customization for Command Interface.

Final Office Action recieved Jan. 3, 2019, in related U.S. Appl. No. 15/268,488 (13 pgs).

Non-Final Office Action dated Jul. 20, 2018, in related U.S. Appl. No. 15/268,488 (39 pgs).

Response filed Oct. 19, 2018, in related U.S. Appl. No. 15/268,488 (13 pgs).

Non-Final Office Action dated Jan. 25, 2019, in related U.S. Appl. No. 14/885,015. (33 pgs).

Response filed Apr. 25, 2019, in related U.S. Appl. No. 14/885,015. (16pgs).

Response filed Oct. 21, 2019, in related U.S. Appl. No. 15/098,107. (14 pgs).

Notice of Allowance dated Nov. 1, 2019, in related U.S. Appl. No. 15/098,107. (8 pgs).

Non-Final Office Action dated Nov. 29, 2019, in related U.S. Appl. No. 14/885,015. (41pgs).

Response filed Oct. 9, 2019, in related U.S. Appl. No. 15/268,488. (14 pgs).

Response filed Apr. 3, 2019, in related U.S. Appl. No. 15/268,488. (14pgs).

Non-Final Office Action dated Jul. 9, 2019, in related U.S. Appl. No. 15/268,488. (14 pgs).

Response filed Jul. 30, 2019, in related U.S. Appl. No. 15/098,107. (17 pgs).

Final Office Action dated Aug. 23, 2019, in related U.S. Appl. No. 15/098,107. (22 pgs).

Final Office Action dated Aug. 7, 2019, in related U.S. Appl. No. 14/885,015. (38pgs).

Non-Final Office Action dated Apr. 30, 2019, in related U.S. Appl. No. 15/098,107. (22 pgs).

Nanduri et al.,"Requirements validation via automated natural language parsing," Journal of Management Information Systems 12, No. 3 (1995): 9-19. (7 pgs).

Notice of Allowance dated Feb. 5, 2020, in related U.S. Appl. No. 15/098,107. (8 pgs).

Notice of Allowance dated Dec. 11, 2019, in related U.S. Appl. No. 15/268,488. (8 pgs).

Response filed Mar. 2, 2020, in related U.S. Appl. No. 14/885,015. (17pgs).

Arista at-a-glance, "CloudVisionTM: Single Point of Administration and Management," [online], [retrived Mar. 1, 2015]. Retrieved from Internet <URL: https://www.arista.com> (3 pgs).

Arista at-a-glance, "EOS Cloudvision ," [online]. Retrieved from Internet <URL: https://www.arista.com>, 2015 (2 pgs).

Patseer, "Voice Recognition—Controlling mobile devices using voice commands," [online] , [retrived Mar. 1, 2015] Retrieved from Internet <URL: http://patseer.com>, 2015 (27 pgs).

Final Office Action dated Jun. 11, 2020, in related U.S. Appl. No. 14/885,015 (49 pgs).

\* cited by examiner

700

Command Vector Table

| Command | Command Attribute | Property 1: type | Property 2: length | Property 3: min value | Property 4: max value | Property n: ... |
|---|---|---|---|---|---|---|
| Interface VLAN | VLAN name | String | 64 chars | 1 | 64 | ... |
| Interface VLAN | VLAN ID | Integer | 4094 | 0 | 4093 | ... |
| Interface 10Gig | Interface name | String | 32 chars | 1 | 32 | ... |
| Interface 10Gig | Interface ID | Integer | 64 | 1 | 64 | ... |
| Interface 10Gig | MTU size | Integer | 10K | 64 | 10K | ... |
| ... | ... | ... | ... | ... | ... | ... |

TEST VECTOR GENERATION FROM DOCUMENTATION

CROSS-REFERENCE TO RELATED APPLICATION

This application is a continuation-in-part of and claims the benefit of and priority, under 35 U.S.C. § 120, to U.S. patent application Ser. No. 14/885,015, filed on Oct. 16, 2015, entitled "DOCUMENT VERIFICATION," which is incorporated by reference herein in its entirety.

BACKGROUND

A. Technical Field

The present disclosure relates to technical documentation and functional products. More particularly, the present disclosure related to systems and methods that automates generation of one or more test vectors from technical documentation for functional products, such as devices and/or services.

B. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Ever increasing demands for data and communications have resulted in vast arrays of ever expanding networks that comprise information handling systems. As these networks evolve and expand, new features and functionality are added at different times and for different reasons.

When new features are added to a product, new documentation needs to be generated that describes the new features and how to implement or execute those features. For a new version of a product or foe a new product, the corresponding amount of documentation can also be quite voluminous.

Regardless of the amount of documentation, it is critical that the documentation accurately describe the product and its functionalities. If the documentation differs from the product (e.g., fails to include descriptions of new features, fails to exclude descriptions of features that are no longer supported, has omission, has typographical errors, or other errors), then customers are likely to become frustrated. Similarly, if the documentation is correct but the product has errors, it can also produce frustration.

Frustrated customers are a serious concern to any business. Costs increase due to added technical support calls. Engineering talent is diverted from developing new products to troubleshooting. And, sales can be negatively impacted. Thus, any mismatches between a product's functionality and its corresponding documentation can have severe consequences to a company's profitability.

Given the complexity of today's technical product offerings, not only are the product features vast but they are also highly technical—making it quite difficult and laborious to check for errors. Accordingly, what is needed our systems and methods that help automate the process for generating test vectors from technical documentation to test technical products (such as, devices, services, or both).

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 7 graphically depicts a command template sequence tree according to embodiments of the present disclosure.

DETAILED DESCRIPTION OF THE PREFERRED EMBODIMENTS

Figure 1:
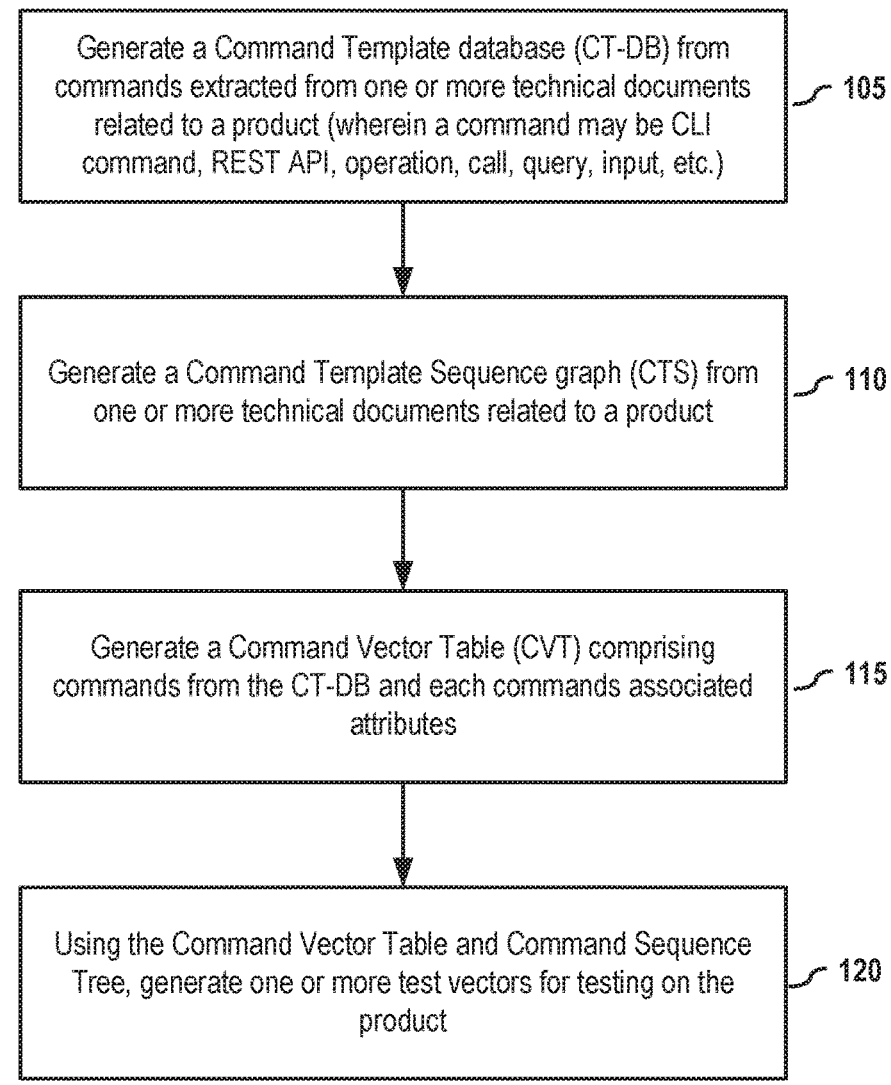
FIG. 1 depicts a method for generating test vector according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system/device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "data," "information," along with similar terms may be replaced by other terminologies referring to a group of bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the current patent document include systems and methods to generate one or more test vector from documentation. In embodiments, one of the main tasks is to extract a data-model/command template from natural language expressions in technical documents related to a specific product and to identify the range and sequence of valid inputs to the data-model. Given a command or a sequence of commands, the ranges of attributes may be used to generate a table of {object:attributes} and constraints on which they may be tested.

FIG. 1 depicts a method for generating a test vector according to embodiments of the present disclosure. In embodiments, a command template database (CT-DB) is built (105) from commands extracted from one or more technical documents related to a product, which may be a device, service, or combination thereof. The term "command" shall be understood to cover a broad array of elements, such as a command-line-interface (CLI) command, an application programming interface (API), a Representational State Transfer (REST) API, an operation, a call, a query, an input, a request, a script, etc. Also, in embodiments, a command template sequence graph or tree (CTS) is built (110) by extracting order information from the one or more technical documents related to the product. In embodiments, the command template database may be used to generate (115) a command vector table (CVT) that associates attributes with the extracted commands. In embodiments, the attributes may have specific types, ranges of values, etc. In embodiments, the command vector table and the command template sequence may be used to generate (120) one or more test vectors for testing on the product.

Figure 2:
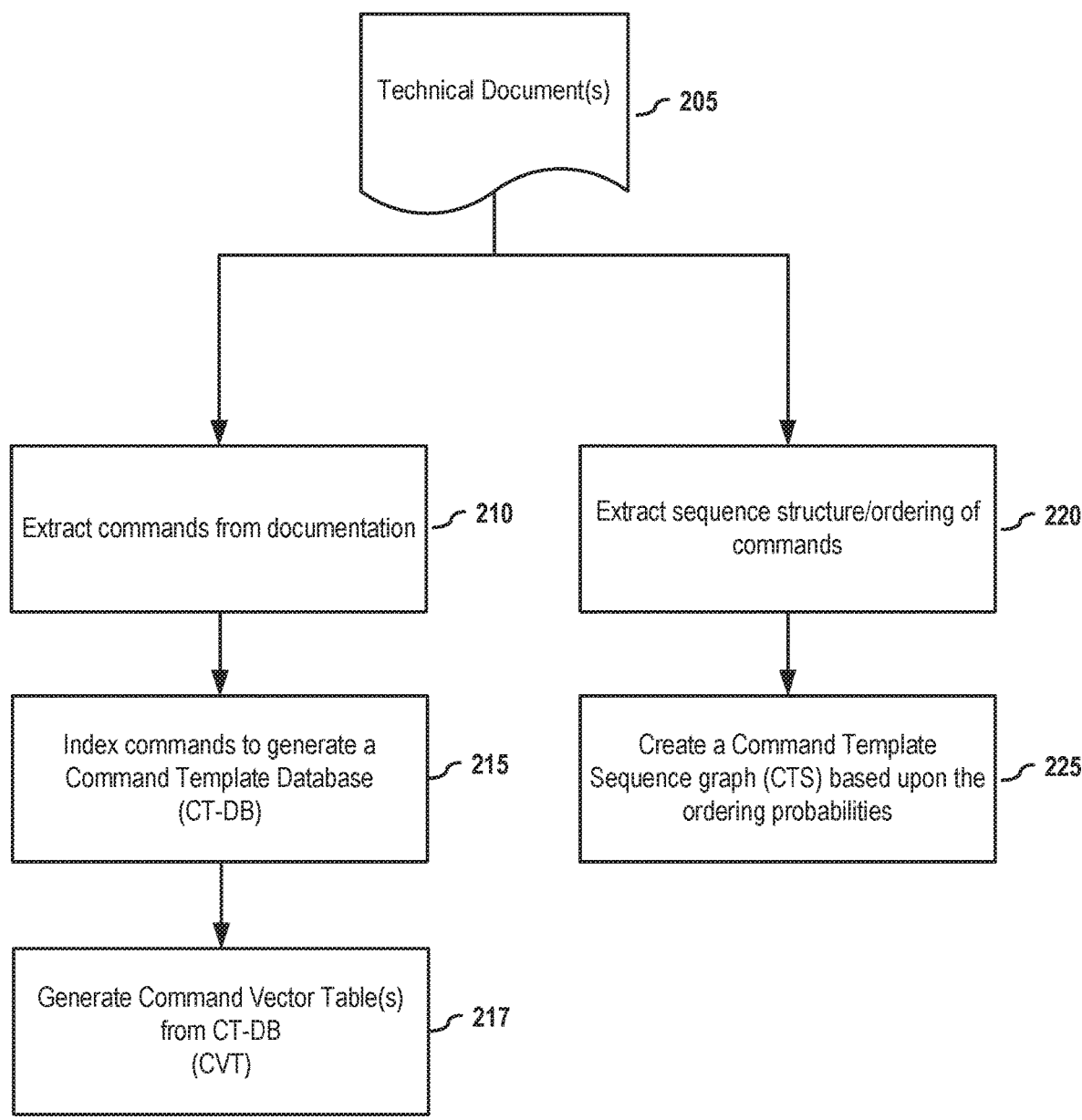
FIG. 2 depicts a method for generating a command template database (CT-DB), a command vector table or database (CVT), and command template sequence graph (CTS) from documentation according to embodiments of the present disclosure.

FIG. 2 depicts a method for generating a command template database (CT-DB), a command vector table or database (CVT), and command template sequence graph (CTS) from documentation according to embodiments of the present disclosure. As shown in FIG. 2, one or more technical documents 205 are used to generate the CT-DB, CVT, and CTS. As will be explained in more detailed below, in embodiments, the CT-DB is generated from the technical document(s) by extracting (210) commands and indexing (215) them. As will be explained in more detailed below, in embodiments, the CVT is generated (217) from the CT-DB by extracting attributes of commands on which the functionality of a product may be tested. Also depicted in FIG. 2, the technical document(s) are used to extract (220) sequence structure or ordering of commands. The extracted sequencing may then be used to create (225) a command template sequence graph or tree.

B. Database Generation

1. Generating a Command Template Database (CT-DB)

Figure 3:
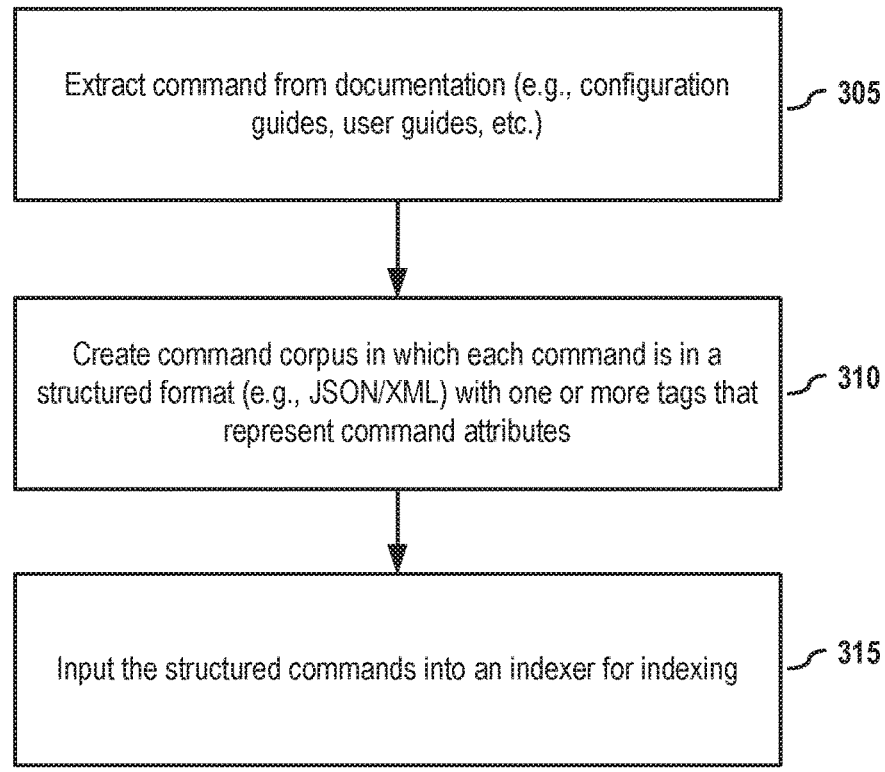
FIG. 3 depicts an example of a method for building a command template database according to embodiments of the present disclosure.

In embodiments, a command template database is consulted in a test-vector generation system for generating the command vector table database, which is used to lookup a command and/or command-attributes parameters or properties (e.g., type, maximum value, minimum value, or other documented constraints) for the particular product. In embodiments, a term frequency-inverse document frequency (TF/IDF)-based ranking function is used to get the most relevant match for a command query input. In embodiments, the APACHE LUCENE index engine may be used to index commands (e.g., CLIs and REST APIs) for template lookup. FIG. 3 depicts an example of a method for building a command template database according to embodiments of the present disclosure.

(i) Command Extraction

As shown in embodiment depicted in FIG. 3, the process commences by extracting (305) commands from documentation. In embodiments, manual, semi-manual (using regular expressions, python, etc.), automatic methods, or combinations thereof may be used to extract commands from documentation, such as configuration guides and other source materials. For example, font type and/or size and known precursor statement (e.g., <word>#, | for options, [ ] or ( ) for options, etc.) of the command-syntax may be used to extract command features. In embodiments, copying and pasting command definition tables from portable document format (PDF) files into command definition files tended to be more accurate than statistical models, although statistical models may also be used to automate the extraction. One skilled in the art shall recognize that there are many ways in which to extract or "mine" content, such as tables and other multi-column structures, from PDF and other documentation files in a deterministic way, and such approaches may be utilized herein.

In embodiments, a document may comprise a command definition data set associated with the product. For example, a command definition data set, such as a YANG ("Yet Another Next Generation") data model, may be included with the source code of a product release, whether a new product release or an update release. A YANG model explicitly determines or defines the structure, semantics, and syntax of data, which can be configuration and state data. It should be noted that while references are made in this patent document to YANG models, other data models, schema, and the like (which may be referred to herein generally as a "structured data set," a "definition data set," or the like) may also be used. In embodiments, the structured data sets may be part of the documentation and used to extract information about commands.

(ii) Command Indexing

Returning to FIG. 3, in embodiments, a command corpus is created (310) in a structured format (e.g., JavaScript Object Notation (JSON)/Extensible Markup Language (XML)) and it is labelled with one or more tags. In embodiments, the tags may include such things as key-value pairs (e.g., [interface_type:vlan], [name:vlan_name], etc.). The extracted commands may then, in embodiments, be inputted (315) into an indexer, such as LUCENE, for indexing to create one or more indexes of the target-specific command templates. It shall be noted that this is trivial from the LUCENE API point of view, in which the path to the JSON/XML documents are passed to the LUCENE Index API. The output is a set of indexes. These indexes may be used as part of a lookup when the test vector generation system wants to match the most relevant command object to the query command input.

2. Generating a Command Template Sequence (CTS)

Figure 4:
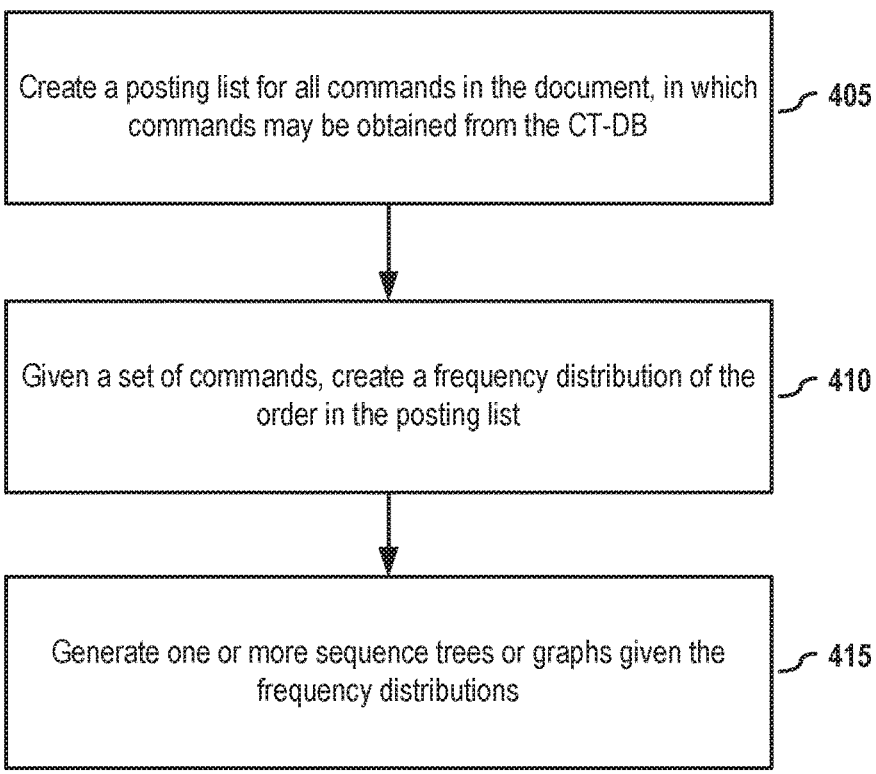
FIG. 4 depicts an example method for building a command template sequence (CTS) tree/graph database according to embodiments of the present disclosure.

FIG. 4 depicts an example method for building a command template sequence (CTS) tree/graph database according to embodiments of the present disclosure. As shown in FIG. 4, in embodiments, a posting list for commands in a document is created (405). In embodiments, a list of the commands to be identified in the document may be obtained from the CT-DB. Given a set of commands, a frequency distribution of the order may be obtained (410) from the posting list. In embodiments, a sequence tree or graph may then be generated (415) given the frequency distributions by selecting the highest frequency distributions. In embodiments, if different frequency distributions are within a threshold, then one or more alternate trees or graphs may also be generated. For example, frequency distributions that are within a threshold value may all be included in the CTS data. In embodiments, the threshold level may be automatically set, may be user-selected, or may be some combination thereof. In embodiments, a user may be presented with and select from options regarding possible sequences.

Consider, by way of illustration, the following example. Assume, for this example that the there is only one document in the documentation and that there are only three commands (C1, C2, and C3). The following are permutations of possible ordering:

C1, C2, C3
C1, C3, C2
C2, C1, C3
C2, C3, C1
C3, C1, C2
C3, C2, C1

The issue of extracting the order (or sequence) of commands may be solved by first creating a postings list (which is also known as an inverted list) of commands. The commands are extracted from the document and a postings list created:

| Dictionary: | Postings: |
| --- | --- |
| C1 | 2→4→5→7→19→ . . . |
| C2 | 1→2→3→5→23→ . . . |
| C3 | 1→3→4→5→ . . . | where the posting number refers to the command's position in the document.

Given a set of commands, the most probable order or orders may be identified by creating a frequency distribution of the order of their postings/occurrence in the document(s). In embodiments, the highest density probability from the ordered list may be taken as the most probable order. In this example, the most probable command sequence is C2, C3, C1.

It shall be noted that, in embodiments, Bayesian probability may be used to ascertain the order of sequence of commands. For example, for every subset of commands (e.g., x, y, z), the various sequence probability of may be calculated: $P(x|y)$, $P(x|z)$, $P(y|x)$, $P(z|x)$, etc. A matrix, m, may be generated of the probabilities relative to the various documents in the documentation:

|  | x | y | z |
| --- | --- | --- | --- |
| $Document_1$ | | | |
| $Document_2$ | | | |
| . . . | | | |
| $Document_n$ | | | |

In embodiments, a command sequence table of n-tuple commands may be created and the relational order of occurrence may be determined by selecting the n-tuple for the candidate command with the highest frequency.

Figure 5:
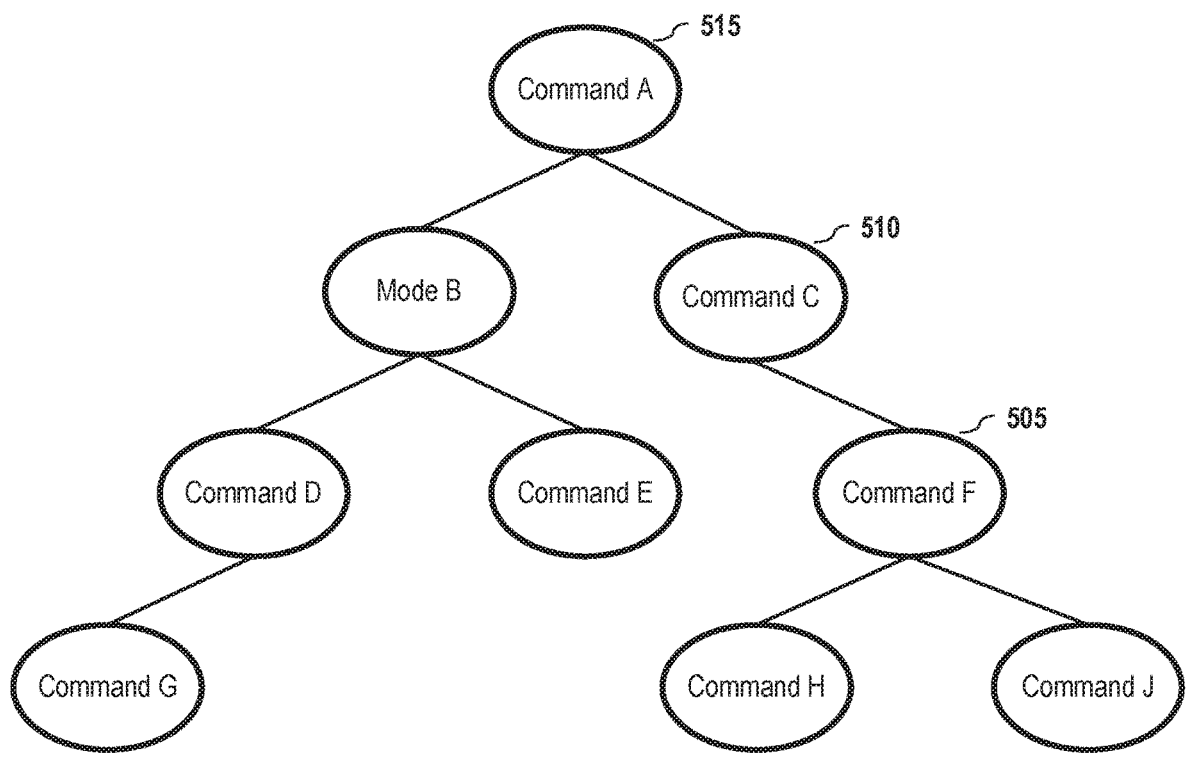
FIG. 5 graphically depicts an example command template sequence tree according to embodiments of the present disclosure.

FIG. 5 graphically depicts a command template sequence tree according to embodiments of the present disclosure. In embodiments, the sequence tree may be used to identify a command chain for a test command. For example, if a test vector for Command F 505 is desired, the command tree 500 may be queried for that command. Once located, movement up the tree 500 identifies the command chain. In this example, the sequence would be Command A 515→Command C 510→Command F 505.

C. Generating a Command Vector Table (CVT)

Figure 6:
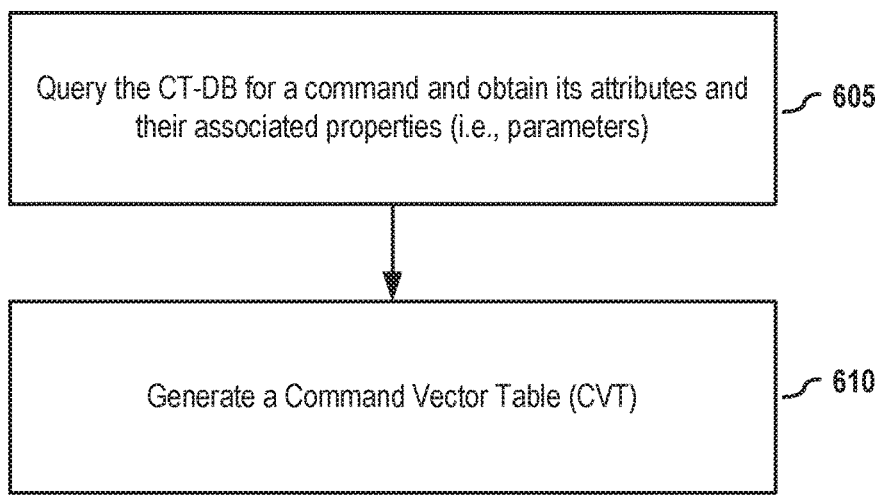
FIG. 6 depicts an example methodology for generating a command vector table (CVT) according to embodiments of the present disclosure.

FIG. 6 depicts an example methodology for generating a command vector table (CVT) according to embodiments of the present disclosure. As shown in FIG. 6, in embodiments, a command template database (CT-DB) may be queried (605) for a command to obtain its attributes and their associated properties. Given a command and its attributes and their associated properties, a table may be generated (610) that summarizes this information.

Consider by way of example, the sample command vector table 700 in FIG. 7. As shown in FIG. 7, a command 705 (e.g., "interface VLAN") is included in the table 700 with its associated attribute(s) 710 (e.g., VLAN name and VLAN ID) and their associated property or properties 715 (e.g., type, length, minimum value, maximum value, etc.). This information is beneficially used to generate constraints for a command when generating a test vector.

For example, in embodiments, the CVT is a tabulation of information in the CT-DB by parsing individual commands and associating attributes and their respective constraints to a command. Consider, by way of example, creating a CVT entry for "interface vlan" from documentation, such as product configuration guide, from which attributes and constraints for "interface vlan" are extracted. An excerpt from an S4810 configuration guide includes the following:

"Virtual LANs, or VLANs, are a logical broadcast domain or logical grouping of interfaces in a LAN in which all data received is kept locally and broadcast to all members of the group. When in Layer 2 mode, VLANs move traffic at wire speed and can span multiple devices. FTOS supports up to 4093 port-based VLANs and 1 Default VLAN, as specified in IEEE 802.1Q. Note: E-Series ExaScale platforms support 4094 VLANs with FTOS version 8.2.1.0 and later. Earlier ExaScale supports 2094 VLANS."

From this excerpt, it can be extracted that this platform supports 4093 interface VLANS.

A YANG model representation of interface VLAN is as follows:

```
list entry {
    key "ifindex";
    description "This grouping defines vlan interface object";
    leaf id {
        type base-cmn:vlan-id;
        description "the vlan id associated with interface";
    }
}
leaf ifindex {
    type base-cmn:logical-ifindex;
    description "index received from to/kernel for interface";
}
leaf name {
    type string;
    description "Name associated with the interface";
}
leaf mac-address {
    type base-cmn:mac-address;
    description "Vlan interface MAC Address";
}
leaf ip-address {
    type base-cmn:ipv4-address;
    description "IP address associated with the VLAN";
}
```

-continued

```
}
leaf num-ports-untagged {
    type uint32;
    description "number of members in the VLAN interface";
}
leaf-list untagged-ports {
    type base-cmn:logical-ifindex;
}
leaf num-ports-tagged {
    type uint32;
    description "number of members in the VLAN interface";
}
leaf-list tagged-ports {
    type base-cmn:logical-ifindex;
}
leaf enable-statistics {
    type boolean;
    description "Enable/Disable statistics";
}
leaf learning-mode {
    type boolean;
    description "Enable/Disable learning per VLAN";
}
}
```

Based on these two sets of data, a Command Template database may be created as previously discussed. Note that command attributes of interest may be selected; that is, in embodiments, not each and every attribute for a given command need be entered into the CT-DB. Presented below is an example template for the CT-DB:

```
{
[
    { command: create vlan <vlan-id>
      vlan-id : {
              type: "int"
              range: { 1, 4093 }
              except: { }
      }
      level: "config"
      creates_context: vlan
    },
    { command: vlan name <vlan-id> <vlan-name>
      vlan-id : {
              type: "int"
              range: { 1, 4093 }
              except: { }
      }
      vlan-name: {
              type: "string"
              range: { [a-zA-Z0-9]* }
              except: { }
      }
      level: vlan
      creates_context: none
    }
]
}
```

Once the CT-DB is prepared, individual commands and their attributes may be tabulated into a table in the CVT by parsing the CT-DB. Thus, in embodiments, for each command selected from the CT-DB or for each command in the CT-DB, its corresponding command template in the CT-DB is parsed to tabulate at least some of its associated attributes and parameters into a CVT record.

Then, for a given command, based on its attributes and constraints obtained from the CVT, one or more test vectors may be generated. Some example are listed below:

Test vector for creating VLAN based on range parameter
create vlan 1 . . . (pass)

create vlan 2 . . . (pass)
create vlan 4093 . . . (pass)
create vlan 4094 . . . (failed—out of range)
Test vector for creating VLAN based on type parameter
create vlan A . . . (failed—type mismatch)
create vlan 1.0 . . . (failed—type mismatch)
Test vector for creating VLAN based on type and range parameters
create vlan 1 . . . (pass)
create vlan 1 name ABC . . . (pass)

Test vector generation and test vector verification are described in more detail below.

D. Test Vector Generation & Verification

Figure 8:
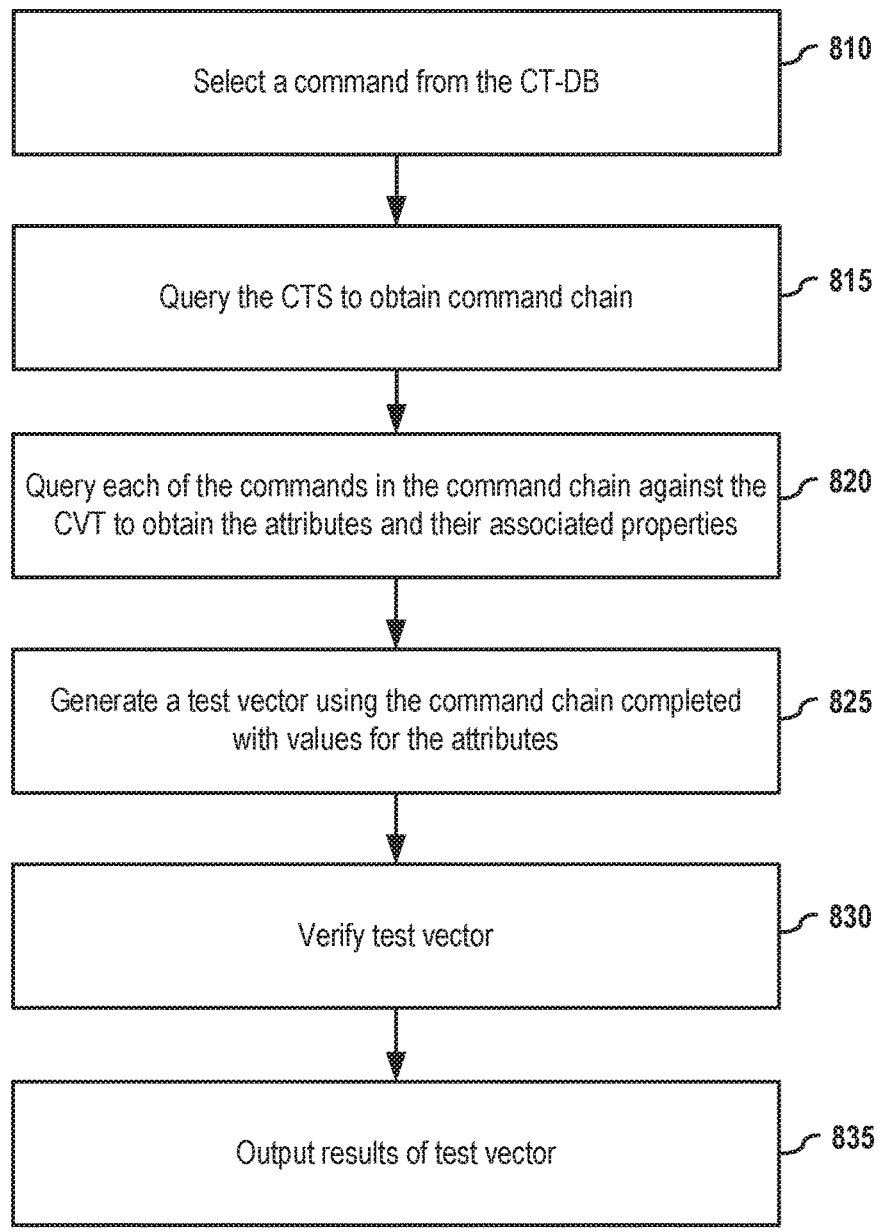
FIG. 8 depicts an example methodology for generating a test vector according to embodiments of the present disclosure.

Embodiments of test vector generation and test vector verification are presented below. FIG. 8 depicts an example methodology for generating a test vector according to embodiments of the present disclosure. In embodiments, a command is selected (810) from the command template database (CT-DB). In embodiments, the selection process may be initiated as part of an automatic process or may be user initiated. The command template sequence graph (CTS) is queried (815) using the selected command to obtain a command chain sequence for the selected command. In embodiments, the command chain sequence comprises one or more commands and their sequence that are used to execute the selected command.

In embodiments, given the set of commands in the command chain, those commands may be queried (820) against the command value table (CVT) to obtain the attributes and their associated properties, such as value ranges, for each of the commands. Now that the command chain is known, the attributes of those commands, and their associated properties, a test vector may be generated (825), complete with values for the attributes.

In embodiments, the assigned values may be randomly selected from within an acceptable set of values for an attribute. Alternatively, a user may be prompted to provide values or may provide values as part of an input/request. In yet another embodiment, the values may be a set of typical values for testing or other values that are points or values of interest for testing. For example, test vectors may be generated that test for the upper, mid, and lower range of values. It shall be noted that values may be continuous (e.g., min/max, step, range) or discrete (e.g. disjoint set) values. In embodiments, at least one or more of the values may be obtained from querying the product upon which the test vector will be tested. For example, a VLAN ID may be obtained by querying the product. In embodiments, a combination or combinations of the above-mentioned embodiments may be used.

In embodiments, the generated test vector may be applied to a product (i.e., a device or service) to obtain test results (835) by using one or more verification tools (such as, test director, home-grown python scripts, etc.). For example, it may be examined whether the test vector resulted in the product performing as expected, performing differently than expected, or returning an error. Unexpected results, including errors, may be examined by a system or user to determine a root cause for the result.

In embodiments, the process may be repeated by selecting another command for which a test vector may be generated.

In embodiments, it shall be noted that there may be more than one command chain for a test command (or command of interest). A plurality of command chains may arise because of options in command sequences, differences from documents used to generate the command tree sequence data, or uncertainty in determining which is the correct command sequence. Accordingly, FIG. 9 depicts an example methodology for generating and verifying one or more test vectors for a command according to embodiments of the present disclosure.

Figure 9:
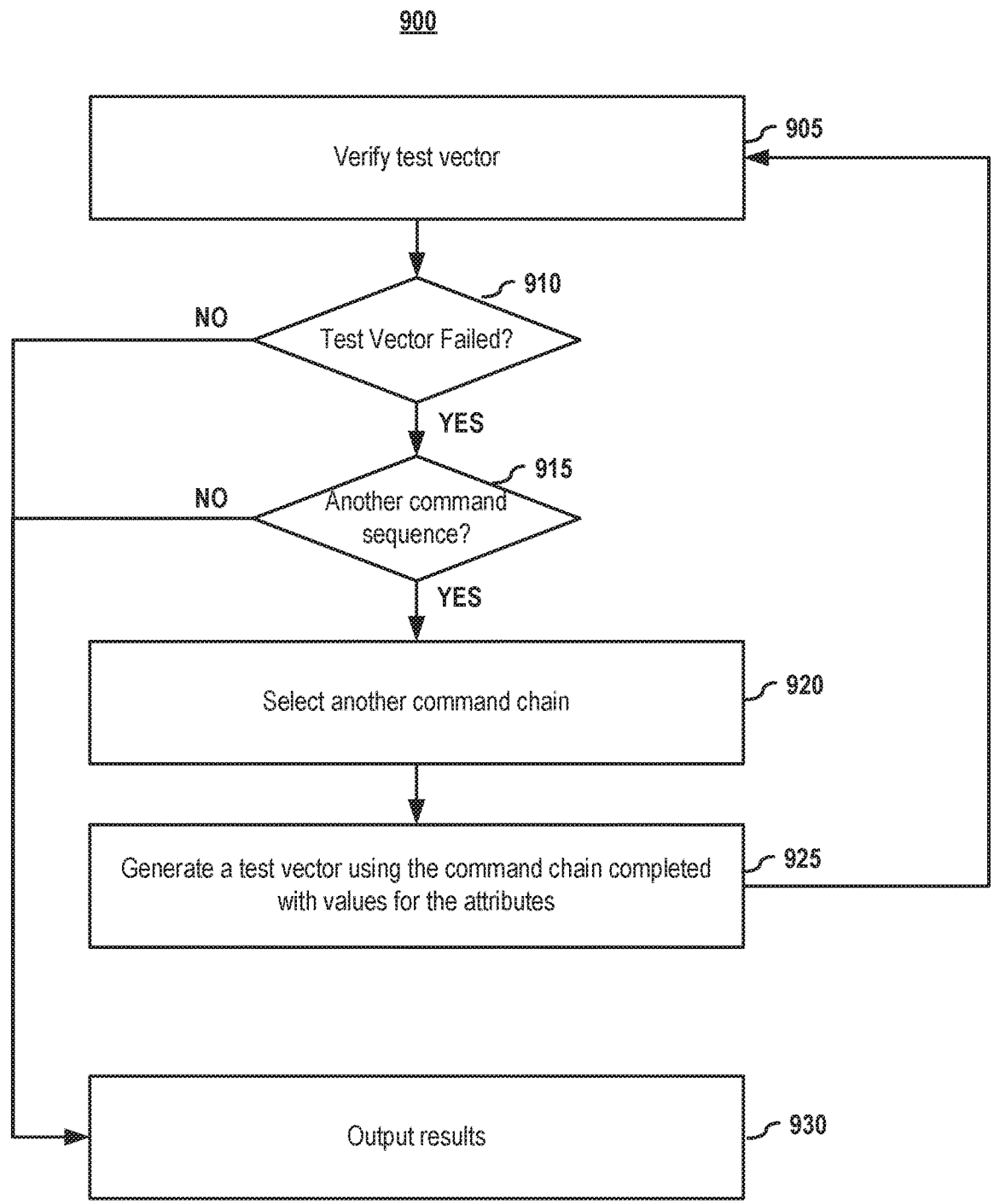
FIG. 9 depicts an example methodology for generating and verifying one or more test vectors for a command according to embodiments of the present disclosure.

As shown in FIG. 9, a test vector is verified (905) against a product. In embodiments, the test vector may be generated as described in FIG. 8. Thus, in embodiments, the method of FIG. 9 may be combined with that of FIG. 8.

Responsive to the test vector not failing, output results may be produced (930). However, responsive to the test vector having some unexpected result (such as failing), a determination may be made regarding whether a query of the command in a command template sequence database produced more than one possible command sequence. If there is only one such command chain, the result may output (930) for notification purposes, further analysis, or both.

However, if another command sequence is possible, it may be selected (920) and a new test vector for that command chain may be generated (925). The process may be repeated with a new test vector being verified (905) until no other command chains exist.

It shall be noted that, in embodiments, the method of FIG. 9 may be altered. For example, the method may be such that there is no test for failure at step 910 and every possible command chain for a command of interest has a test vector generated and tested. Or, in embodiments, after outputting the results from a test vector, the process returns to step 915 to determine whether another command sequence exists to be tested.

E. System Embodiments

1. Natural Language Processing (NPL) System

Figure 10:
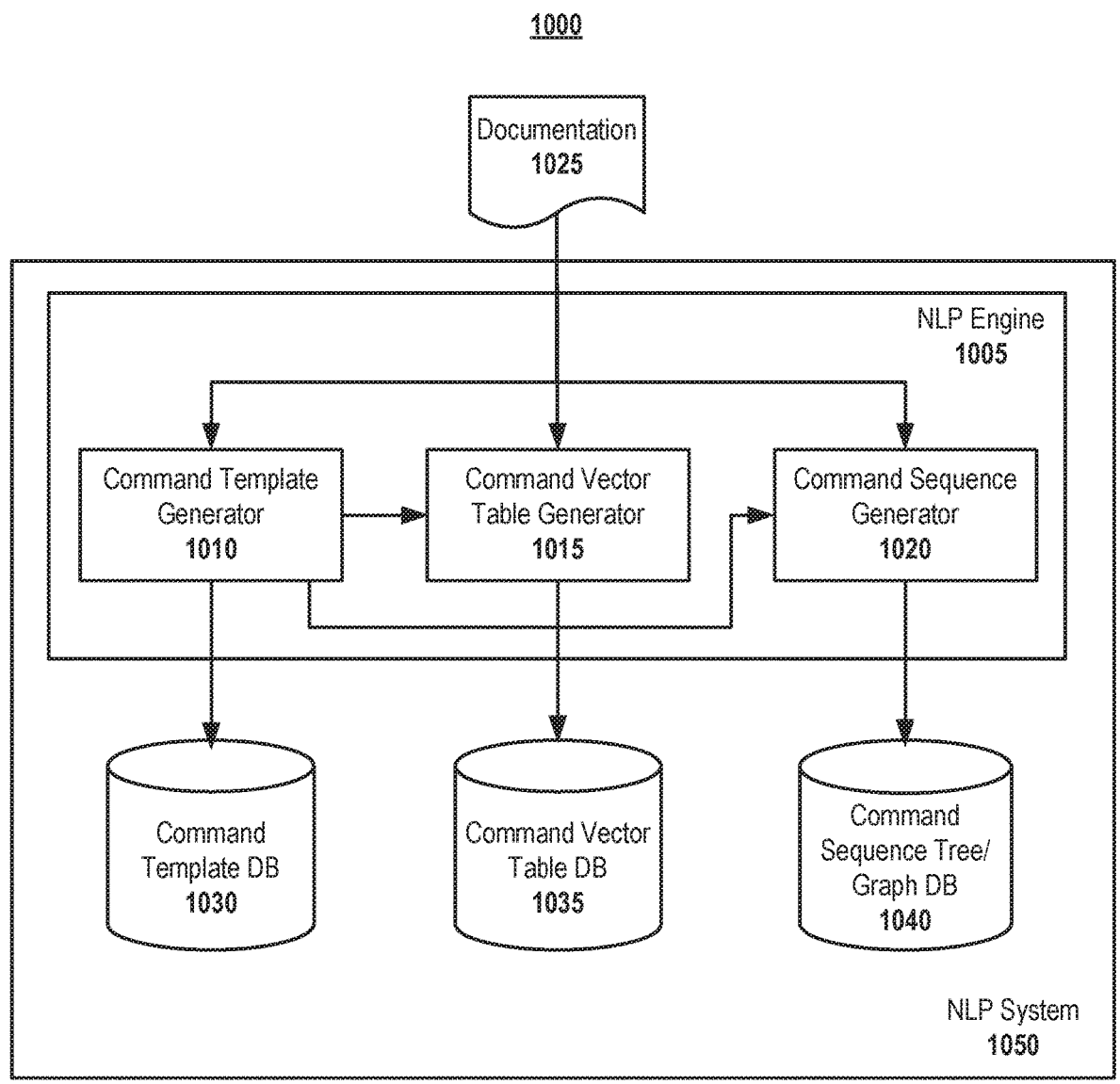
FIG. 10 depicts a natural language processing (NLP) system for generating datasets used in creating a test vector from documentation according to embodiments of the present disclosure.

FIG. 10 depicts a natural language processing (NLP) system for generating dataset for generating a test vector from documentation according to embodiments of the present disclosure. In the depicted embodiments, the system 1050 receives as input documentation 1025 from which a command template database 1030, a command vector table database 1035, and a command sequence tree database 1040 are created. In embodiments, the system 1050 comprises a natural language processing (NLP) engine 1005 and memory for storing the aforementioned databases.

In embodiments, the NLP engine 1005 comprises three subsystems: a command template generator 1010; a command vector table generator 1015; and a command sequence generator 1115.

In embodiments, the command template generator 1010 receives as input the documentation 1025 and generated the command templates. In embodiments, the command template generator 1010 generates the command templates for the command template database 1030 using one or more of the methods disclosed above with respect to FIG. 2 and FIG. 3.

In embodiments, the command vector table generator 1015 receives as inputs the documentation and commands from the command template generator 1010 (or alternatively, or additionally, from the command template database 1030) and generates command vector tables for the commands. In embodiments, the command vector table 1015 generates the command vector tables for the command vector table database 1035 using one or more of the methods disclosed above with respect to FIG. 2, FIG. 6, and FIG. 7.

In embodiments, the command sequence generator 1020 receives as inputs the documentation and commands from the command template generator 1010 (or alternatively, or additionally, from the command template database 1030) and generates command template sequence graphs for the commands. In embodiments, the command sequence generator 1020 generates the command sequence trees for the command sequence tree/graph database 1040 using one or more of the methods disclosed above with respect to FIG. 2, FIG. 4, and FIG. 5.

2. Test Vector Generator System

Figure 11:
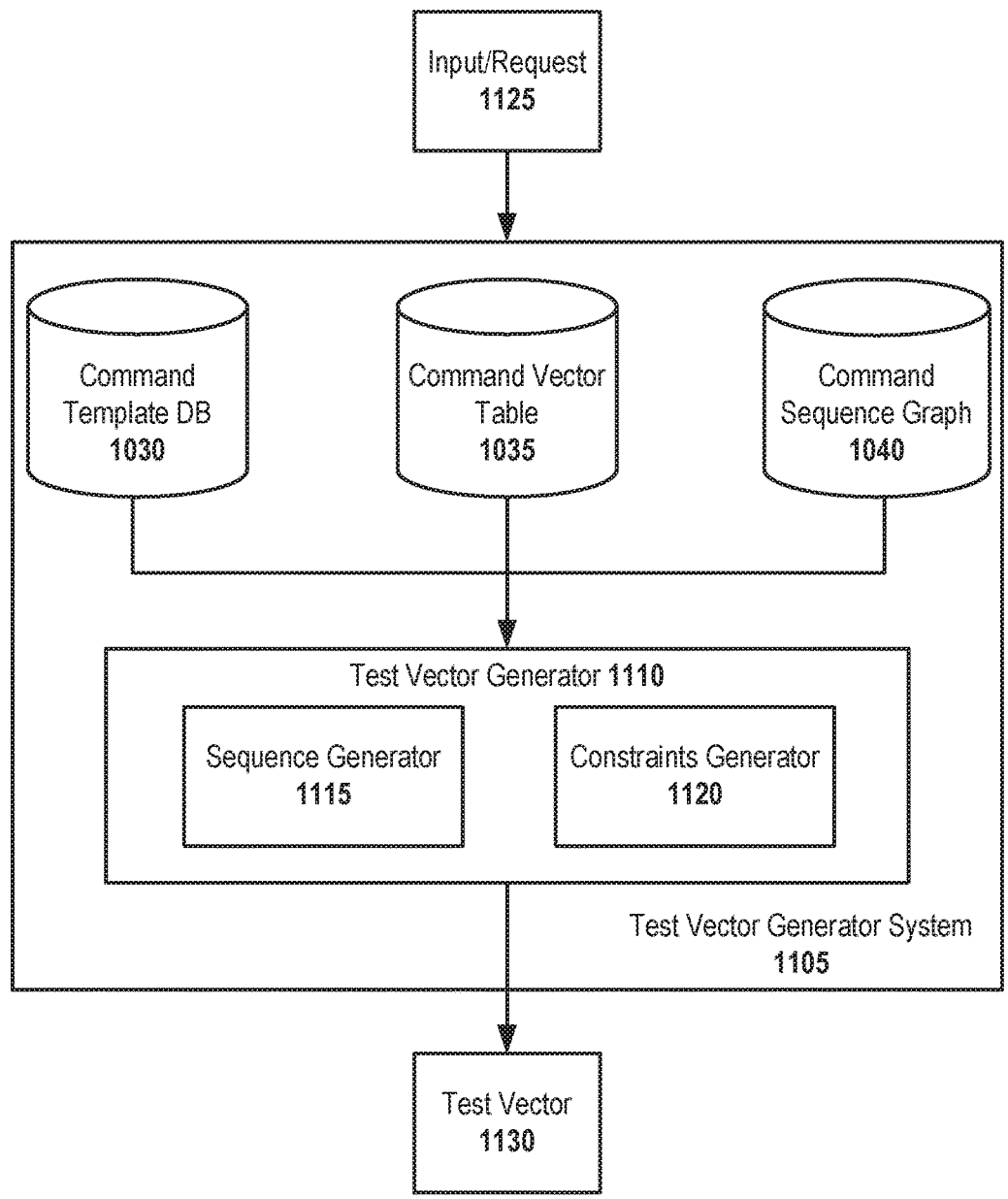
FIG. 11 depicts a test vector generator system for generating a test vector from documentation according to embodiments of the present disclosure.

FIG. 11 depicts a test vector generator system 1105 for generating a test vector from documentation according to embodiments of the present disclosure. In the depicted embodiments, the system 1105 receives an input or request 1125, which may comprise a request about a specific command, and outputs a corresponding test vector 1125 for that command. In embodiments, the system 1105 comprises a command template database 1030, a command vector table database 1035, a command sequence tree database 1040, each of which may be obtained from a natural language processing (NLP) system, such as disclosed in FIG. 10. In embodiments, the test vector generator system 1105 also comprises a test vector generator 1110 that is communicatively coupled to the aforementioned databases 1030-1040 and uses that information to generate a test vector for the command of interest 1120.

In embodiments, the test vector generator 1110 comprises two subsystems: a sequence generator 1115 and a constraints generator 1120. In embodiments, the sequence generator receives the input 1125 and queries the command sequence graph database 1040 to obtain one or more command chains for the input 1125.

In embodiments, given the command chain, the constraints generator 1120 obtains for each command in the command chain, attributes and properties or constraints about which a test vector may be generated for testing. For example, in embodiments, given a command from the command chain, the constraints generator 1130 may query the command value table (CVT) database 1035 to obtain the command's attributes and their associated properties, such as value ranges. The constraints generator 1120 may then assign values. In embodiments, the assigned values may be randomly selected from within an acceptable set of values for an attribute. Alternatively, a user may be prompted to provide values or may provide values as part of the input/request 1125. In yet another embodiment, the values may be a set of typical values for testing. For example, test vectors may be generated that test for the upper, mid, and lower range of values. It shall be noted that values may be continuous (e.g., min/max, step, range) or discrete (e.g. disjoint set) values. In embodiments, at least one or more of the values may be obtained from querying the product upon which the test vector will be tested. In embodiments, a combination or combinations of the above-mentioned embodiments may be used.

In embodiments, after values have been assigned to the various elements in the command chain, the test vector 1125 is output.

Figure 12:
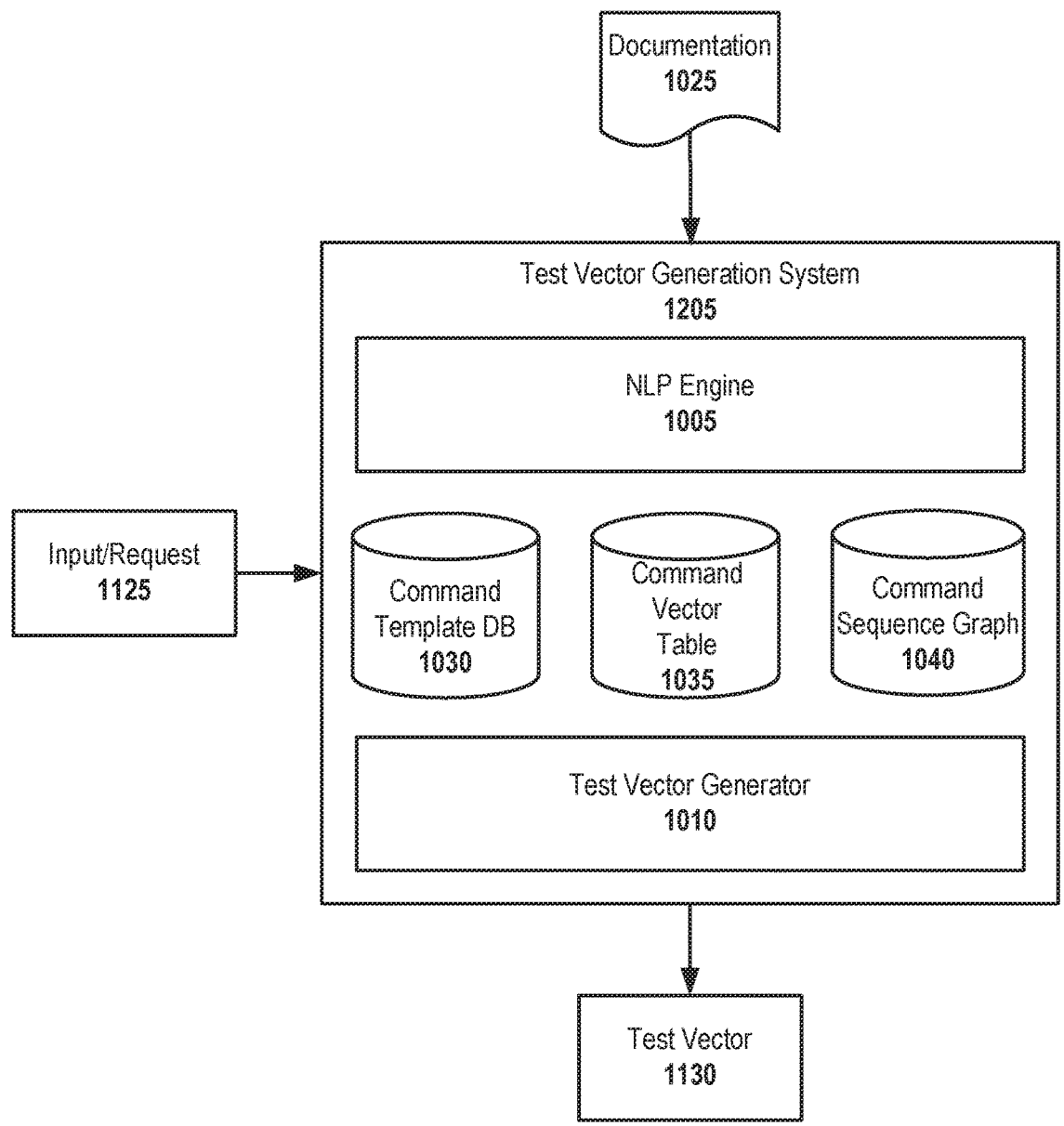
FIG. 12 depicts an alternative embodiment of a test vector generator system for generating a test vector from documentation according to embodiments of the present disclosure.

FIG. 12 depicts an alternative embodiment of a test vector generator system 1205 for generating a test vector from documentation according to embodiments of the present disclosure. As shown in FIG. 12, the test vector generation system 1205 may comprise the natural language processing subsystem 1005 (such as, by way of example, the system described with respect to FIG. 10) and the test vector generator 1010 (such as, by way of example, the system described with respect to FIG. 11). Such a system has the capabilities to generate a command template database 1030, a command vector table database 1035, and a command sequence graph database 1040 from input documentation 1025 and to use the databases to generate a test vector 1125 for a requested command 1120.

3. Test Vector Generator & Verification System

Figure 13:
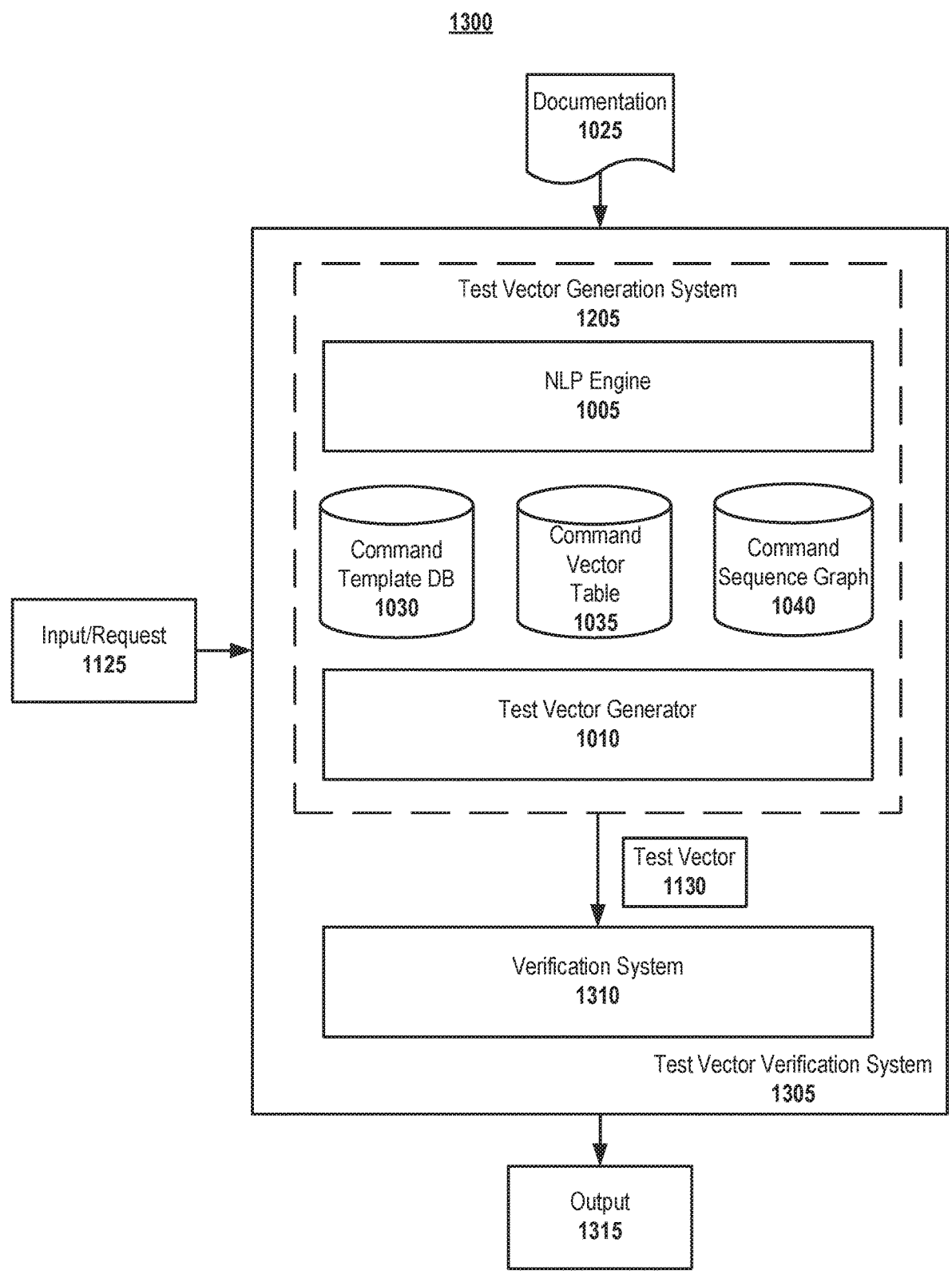
FIG. 13 depicts a test vector verification system for generating and verifying a test vector from documentation according to embodiments of the present disclosure.

FIG. 13 depicts a test vector verification system 1305 for generating and verifying a test vector from documentation according to embodiments of the present disclosure. As shown in FIG. 13, the test vector verification system 1305 may comprise a test vector generation system 1205 (such as, by way of example, the system described with respect to FIG. 12) and a verification system 1310. In embodiments, the verification system 1310 receives a test vector from the test vector generator system 1205 and provides one or more tools for verifying the test vector. As previously mentioned, the tools may include such tools as test generators, homegrown python scripts, etc.

In embodiments, the verification system 1310 may also provide additional tools and features including, reporting, notifications, alerts, diagnostics, displays of outputs, etc. In embodiments, the verification system may be automated or may request user inputs.

One skilled in the art shall recognize a number of potential uses for such systems disclosed herein. For example, such systems may be used to verify one or more command of a specification of a product against the actual product. Or, in embodiments, such systems may be used to validate a deployment guide relative to a user guide. Or, in embodiments, such systems may be used to generate test vectors to test interoperability between devices. Or, in embodiments, such systems may be used to test platform dependent features of a product. It shall be noted that the aforementioned use cases are only some example, and one skilled in the art shall recognize a number of potential applications of such systems.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 14:
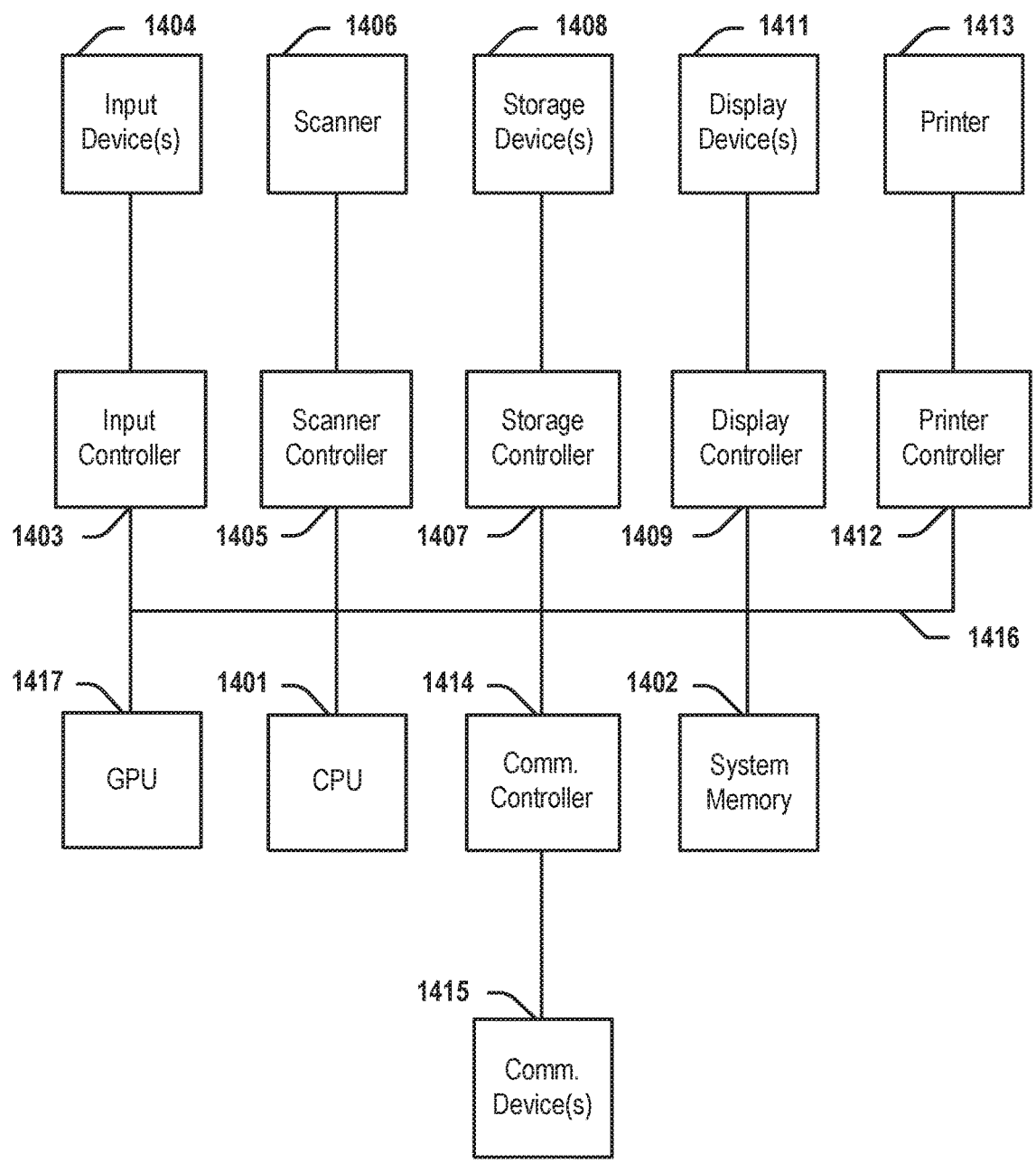
FIG. 14 depicts a simplified block diagram of an information handling system according to embodiments of the present invention.

FIG. 14 depicts a block diagram of an information handling system 1400 according to embodiments of the present invention. It will be understood that the functionalities shown for system 1400 may operate to support various embodiments of an information handling system—although it shall be understood that an information handling system may be differently configured and include different components. As illustrated in FIG. 14, system 1400 includes a central processing unit (CPU) 1401 that provides computing resources and controls the computer. CPU 1401 may be implemented with a microprocessor or the like, and may also include a graphics processor and/or a floating point coprocessor for mathematical computations. System 1400 may also include a system memory 1402, which may be in the form of random-access memory (RAM) and read-only memory (ROM).

A number of controllers and peripheral devices may also be provided, as shown in FIG. 14. An input controller 1403 represents an interface to various input device(s) 1404, such as a keyboard, mouse, or stylus. There may also be a scanner controller 1405, which communicates with a scanner 1406. System 1400 may also include a storage controller 1407 for interfacing with one or more storage devices 1408 each of which includes a storage medium such as magnetic tape or disk, or an optical medium that might be used to record programs of instructions for operating systems, utilities and applications which may include embodiments of programs that implement various aspects of the present invention. Storage device(s) 1408 may also be used to store processed data or data to be processed in accordance with the invention. System 1400 may also include a display controller 1409 for providing an interface to a display device 1411, which may be a cathode ray tube (CRT), a thin film transistor (TFT) display, or other type of display. The computing system 1400 may also include a printer controller 1412 for communicating with a printer 1413. A communications controller 1414 may interface with one or more communication devices 1415, which enables system 1400 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for generating a test vector from technical documentation related to a product comprising:

generating a command template database (CT-DB) comprising one or more commands by extracting commands from the technical documentation using natural language processing;

generating, using the command template database, a command vector table (CVT) database comprising, for each command, at least some of its associated attributes and parameters;

generating, using, at least in part, location order of a command relative to another command or commands in the technical documentation and probabilistic relations based upon occurrences in the technical documentation, a command template sequence graph database that comprises representations of operational precedence ordered relationships of commands extracted from the technical documentation; and Generating a test vector for a command selected from the command template database by:

Obtaining a command chain from the command template sequence database that identifies a set of commands for using the command and an ordering of commands in the set commands;

Obtaining parameters for the commands in the set of command from the command vector table database; and Setting values for the parameters to form the test vector.

2. The computer-implemented method of claim 1 wherein a command comprises one or more of a command line interface (CLI) command, an application program interface (API), operation, call, query, script, or input.

3. The computer-implemented method of claim 1 wherein the step of generating a command template database (CT-DB) comprising one or more commands by extracting commands from the technical documentation using natural language processing comprises:

Extracting the one or more commands from the technical documentation related to the product;

Creating a command corpus of structured commands in which each command is in a structured format; and Inputting the structured commands into an indexer for indexing.

4. The computer-implemented method of claim 1 wherein the step of generating, using the command template database, a command vector table database comprising, for each command, at least some of its associated attributes and parameters comprises:

For each command, parsing its corresponding command template from the CT-DB to tabulate at least some of its associated attributes and parameters into a CVT record.

5. The computer-implemented method of claim 1 wherein the step of generating, using, at least in part, location order of a command relative to another command or commands in the technical documentation and probabilistic relations based upon occurrences in the technical documentation, a command template sequence graph database that comprises representations of ordered relationships of commands extracted from the technical documentation comprises:

Creating a posting list for a set of commands from the technical documentation;

Generating frequency distributions of orderings in the posting list for the set of commands; and Creating one or more sequence graphs of command ordering based upon probabilities of the frequency distributions of orderings.

6. The computer-implemented method of claim 5 wherein the set of commands are obtained from the command template database.

7. The computer-implemented method of claim 1 further comprising:

Using the test vector to verify information from technical documentation against actual functionality of the product.

8. The computer-implemented method of claim 7 wherein the step of using the test vector to verify information from technical documentation against actual functionality of the product comprising:

Using the test vector and one or more verification tools to verify information from technical documentation against actual functionality of the product.

9. The computer-implemented method of claim 8 wherein at least one of the one or more verification tools is an automated tool.

10. An information handling system comprising:

One or more processors;

A non-transitory computer-readable medium or media comprising one or more sets of instructions which, when executed by at least one of the one or more processors, causes steps to be performed comprising:

generating a command template database (CT-DB) comprising one or more commands by extracting commands from the technical documentation using natural language processing;

generating, using the command template database, a command vector table (CVT) database comprising, for each command, at least some of its associated attributes and parameters;

generating, using, at least in part, location order of a command relative to another command or commands in the technical documentation and probabilistic relations based upon occurrences in the technical documentation, a command template sequence graph database that comprises representations of operational precedence ordered relationships of commands extracted from the technical documentation; and Generating a test vector for a command selected from the command template database by:

Obtaining a command chain from the command template sequence database that identifies a set of commands for using the command and an ordering of commands in the set commands;

Obtaining parameters for the commands in the set of command from the command vector table database; and Setting values for the parameters to form the test vector.

11. The information handling system of claim 10 wherein a command comprises one or more of a command line interface (CLI) command, an application program interface (API), operation, call, query, script, or input.

12. The information handling system of claim 10 wherein the step of generating a command template database (CT-DB) comprising one or more commands by extracting commands from the technical documentation using natural language processing comprises:

Extracting the one or more commands from the technical documentation related to the product;

Creating a command corpus of structured commands in which each command is in a structured format; and Inputting the structured commands into an indexer for indexing.

13. The information handling system of claim 10 wherein the step of generating, using the command template database, a command vector table database comprising, for each command, at least some of its associated attributes and parameters comprises:

For each command, parsing its corresponding command template from the CT-DB to tabulate at least some of its associated attributes and parameters into a CVT record.

14. The information handling system of claim 10 wherein the step of generating, using, at least in part, location order of a command relative to another command or commands in the technical documentation and probabilistic relations based upon occurrences in the technical documentation, a command template sequence graph database that comprises representations of ordered relationships of commands extracted from the technical documentation comprises:

Creating a posting list for a set of commands from the technical documentation;

Generating frequency distributions of orderings in the posting list for the set of commands; and Creating one or more sequence graphs of command ordering based upon probabilities of the frequency distributions of orderings.

15. The information handling system of claim 14 wherein the set of commands are obtained from the command template database.

16. Information handling system of claim 10 wherein the non-transitory computer-readable medium or media further comprises one or more sets of instructions which, when executed by at least one of the one or more processors, causes steps to be performed comprising:

Using the test vector to verify information from technical documentation against actual functionality of the product.

17. A non-transitory computer-readable medium or media comprising one or more sequences of instructions which, when executed by at least one processor, causes steps to be performed comprising:

generating a command template database (CT-DB) comprising one or more commands by extracting commands from the technical documentation using natural language processing;

generating, using the command template database, a command vector table (CVT) database comprising, for each command, at least some of its associated attributes and parameters;

generating, using, at least in part, location order of a command relative to another command or commands in the technical documentation and probabilistic relations based upon occurrences in the technical documentation, a command template sequence graph database that comprises representations of functional precedence ordered relationships of commands extracted from the technical documentation; and Generating a test vector for a command selected from the command template database by:

Obtaining a command chain from the command template sequence database that identifies a set of commands for using the command and an ordering of commands in the set commands;

Obtaining parameters for the commands in the set of command from the command vector table database; and Setting values for the parameters to form the test vector.

18. The non-transitory computer-readable medium or media of claim 17 wherein the step of generating a command template database (CT-DB) comprising one or more commands by extracting commands from the technical documentation using natural language processing comprises:

Extracting the one or more commands from the technical documentation related to the product;

Creating a command corpus of structured commands in which each command is in a structured format; and Inputting the structured commands into an indexer for indexing.

19. The non-transitory computer-readable medium or media of claim 17 wherein the step of generating, using the command template database, a command vector table database comprising, for each command, at least some of its associated attributes and parameters comprises:

For each command, parsing its corresponding command template from the CT-DB to tabulate at least some of its associated attributes and parameters into a CVT record.

20. The non-transitory computer-readable medium or media of claim 17 wherein generating, using, at least in part, location order of a command relative to another command or commands in the technical documentation and probabilistic relations based upon occurrences in the technical documentation, a command template sequence graph database that comprises representations of ordered relationships of commands extracted from the technical documentation comprises:

Creating a posting list for a set of commands from the technical documentation;

Generating frequency distributions of orderings in the posting list for the set of commands; and Creating one or more sequence graphs of command ordering based upon probabilities of the frequency distributions of orderings.

* * * * *